United States Patent [19]
Kaminski

[11] Patent Number: 5,169,052
[45] Date of Patent: Dec. 8, 1992

[54] APPARATUS FOR WELDING SHEETING-EDGES

[76] Inventor: Renald Kaminski, An der Friedensburg 2, W-5130 Geilenkirchen, Fed. Rep. of Germany

[21] Appl. No.: 741,773

[22] Filed: Aug. 7, 1991

[30] Foreign Application Priority Data

Sep. 5, 1990 [DE] Fed. Rep. of Germany ... 9012666[U]

[51] Int. Cl.⁵ .......................... B23K 1/14; B30B 3/04; B30B 15/34
[52] U.S. Cl. ....................... 228/9; 228/49.4; 156/574; 156/391
[58] Field of Search ............... 228/9, 102, 173.7, 235, 228/49.4, 44.3; 156/350, 367, 574, 391, 502, 583.4, 497; 219/243, 228

[56] References Cited

U.S. PATENT DOCUMENTS

| | | | |
|---|---|---|---|
| 3,624,836 | 11/1971 | Rohdin | 156/583.4 |
| 4,146,419 | 3/1979 | Neidhart | 156/574 |
| 4,769,102 | 9/1988 | Neumüller et al. | 156/574 |
| 4,855,004 | 8/1989 | Chitjian | 156/499 |
| 4,960,478 | 10/1990 | Newkirk et al. | 156/499 |

FOREIGN PATENT DOCUMENTS 2520217 11/1976 Fed. Rep. of Germany .
3535759 5/1986 Fed. Rep. of Germany .
8816287.7 5/1989 Fed. Rep. of Germany .

Primary Examiner—Richard K. Seidel
Assistant Examiner—Jeanne M. Elpel
Attorney, Agent, or Firm—Joseph W. Berenato, III

[57] ABSTRACT

An apparatus for welding overlapping edges of plastic sheeting comprises a wedge-shaped heater assembly having spaced first and second heating surfaces converging to a wedge-tip. A heating element is operably associated with each of the surfaces for causing heating thereof. A sensor is operably associated with each of the surfaces for monitoring the temperature of sheeting passing therealong. A control system is operably associated with each of the sensors and with each associated heating element for controlling oeration of each of the heating elements in response to the temperature monitored by the associated sensor. A drive system is proximate the wedge-tip for causing sheeting to be advanced over the surfaces and to be compressed together upon passing beyond the wedge-tip for thereby being welded together.

19 Claims, 3 Drawing Sheets

APPARATUS FOR WELDING SHEETING-EDGES

The invention concerns apparatus for welding overlapping sheeting-edges. Such equipment is used in particular to weld sheeting when building dumps. High requirements are set on welding quality because absolute sealing must be assured.

The German Offenlegungsschrift 35 35 759 describes such equipment. It concerns a mobile unit for which the sheeting-edges laid out in overlapping manner will enter this unit as it moves and are guided over a wedge-shaped heater. This wedge-shaped heater is mounted prone, that is the two wedge surfaces converging toward the wedge tip are superposed and the parallel side surfaces are aligned vertically. The dull end of the heater points to the sheeting-edge entry into the equipment.

Each wedge surface of the heater is divided into two partial wedge surfaces spaced apart and with a groove between each of them. The upper sheeting edge is made to pass over the two upper partial wedge surfaces and the lower sheeting edge over the lower two partial wedge surfaces. Both superposed partial wedge surfaces combine rearward into a linear wedge tip, the two sheeting edges being moved together there by means of compression-and-advance rollers and being compressed. The compression-and-advance rollers pull the sheeting edges into the equipment and thereby assure the advance procedure of the equipment.

The heater comprises several adjacent heating elements raising the temperature of the wedge surfaces serving as heating surfaces. Heating proceeds until the sheeting-edges have been plasticized to such an extent in the vicinity of the partial wedge surfaces that when subject to the compression-and-advance rollers, they are welded linearly to each other—on account of the mutually spaced partial wedge surfaces—by means of two welding seams which are correspondingly parallel and spaced apart. A channel is formed between the welding seams and is sealed at one end in order to test the welding-seal tightness, air being introduced at the other end. The welding seams are proper if no air is lost in that test.

The heating elements of the equipment of the German Offenlegungsschrift 35 35 759 are controlled independently from each other in thermostatic manner. A reference is associated with each heating element whereby the heating temperature of each element can be set to a temperature independent of that of the other element. The particular heating-element temperatures then are kept constant by control circuits comprising temperature sensors. The purpose is to avoid different, and uncontrolled operational temperatures on the partial wedge surfaces serving as heating surfaces. Nevertheless, this equipment cannot assure constant welding quality. Lack of tightness recurs.

Similar equipment is disclosed in the German Gebrauchsmuster 88 16 287.7. Essentially its design is the same as in the German Offenlegungsschrift 35 35 759, though it comprises an additional preheater mounted at the inlet side. This preheater heats both sheeting edges equally and serves to lower the inherent rigidity of the sheeting edges to assure better guidance of the sheeting edges along the heater. Again this equipment fails to provide uniform quality of welding.

Lastly the German Gebrauchsmuster 25 20 217 discloses equipment for overlap-welding plastic sheetings, where the superposed sheeting-edges are heated by an infrared radiator inserted between the two and by two subsequent hot-air nozzles. A radiation-measuring instrument is mounted in front of the infrared radiator to measure the temperatures of the mutually facing surfaces of the sheeting edges. From the measurement data the heat output from the infrared radiator and/or the hot-air nozzles is controlled in such manner that approximately the same welding conditions are present when the sheetings are combined. However this goal is achieved only imperfectly because no differentiation takes place regarding the heat applied to either surface.

Accordingly it is the object of the invention to so design apparatus of the initially cited kind that the sheeting edges of plastic sheeting can be welded with high reliability and quality.

This problem is solved by the invention by apparatus of the initially cited kind comprising a wedge-shaped heater with compression-and-advance rollers at the heating surfaces converging at the heater's wedge tip but which are away from each other, at least one heating surface being provided with a heater segment and independently from it, the other, opposite heating surface is provided with a heater segment also, each heater segment comprising at least one heating element associated with its own temperature sensor, to detect the associated sheeting-edge temperature, and with its temperature control.

This design is based on the insight that the difficulties of the known equipment are caused by the sheeting-edges entering this known equipment at strongly different temperatures—especially in the presence of strong sunlight. Most of the plastic sheeting being black, they are strongly absorbing regarding sunlight. Temperature differences of 60° to 80° C. arise thereby between the sheeting edge at the top and hence exposed to sunlight and the sheeting edge at the bottom and covered by the former. As a result, either the upper sheeting edge will be overheated when passing over the heater, or the lower sheeting edge will be inadequately plasticized, or both.

By means of the design of the apparatus of the invention, the surface temperature of the heating surfaces can be matched to the particular sheeting-edge temperature of the heating surfaces at the apparatus inlet, whereby, in relation to the temperature differential between the two sheeting edges, the heating surface receiving the hot sheeting edge shall be heated less than the heating surface guiding the lower sheeting edge. In this manner temperature compensation takes place so that both sheeting edges are heated essentially to the same temperature no later than when in the vicinity of the wedge tip. By means of this design and resorting to preset reference values determined by the material, both sheeting edges can be heated to the optimal welding temperature and then be compressed. In the first place it is possible thereby to compensate for weather factors affecting the sheeting, and consequently the welding result, namely the quality of the welding seam, is optimal. It was found in this respect that the apparatus can be operated at substantially higher speeds than all equipment on the market, without thereby degrading seam quality.

In a development of the invention, two adjacent heater segments pointing in the direction of the wedge tip are associated with each heating surface, and in the light of the basic disclosure of this invention, each heater segment comprises at least one heating element of its own, one temperature sensor of its own and one temperature control of its own. As a result the linearity of heating the sheeting edges is further improved and hence higher reliability is achieved, the temperatures of the sheeting edges being substantially the same at the wedge tip.

Another improvement in heating linearity can be achieved in that a temperature sensor precedes at least one heating surface, said sensor being wired in such manner with the heating element(s) on the same side that when detecting a temperature crossing upward of a boundary value, this or these heating element(s) shall be shut OFF for a given time. By means of this additional temperature sensor, heat buildup may be averted when the upper sheeting edge enters the apparatus at a temperature much raised by exposure to sunlight. This temperature sensor detects that fact and therefore the pertinent heating element(s) for this sheeting edge shall be shut OFF for a given time. As a result the temperature linearity is improved, that is, there is reduction in the temperature amplitudes arising when the entry temperatures of the particular upper sheeting edge vary.

In addition, a temperature sensor may precede both heating surfaces and may be wired in such manner with the heating element(s) on one side that this or these heating element(s) shall but shut OFF for a given time once a specific temperature difference has been detected. In both cases the shutoff time essentially shall correspond to that time in which the sheeting edges move from the temperature sensor(s) to the heating segment(s) on one side. The temperature sensor(s) should be contactless, for instance being infrared sensors.

The heater segments of the invention may be continuous as far as the wedge tip, even when several heating segments are provided which are adjacent as seen in the direction of advance of the sheeting edge. As an alternative, the heater segments may be present only over part of the heater and terminate earlier than the wedge tip zone. In this case preferably the heater shall comprise at least one heating element for both heating surfaces in the wedge-tip zone, the heating elements in the heater segments ensuring that upon arriving in the wedge-tip zone, the sheeting edges shall be at the same temperature.

In order to preclude thermal interaction between the heater segments themselves and the wedge-tip zone, the heater segments should be thermally insulated from one another and/or from the wedge-tip zone. Moreover, preferably, at least one additional temperature sensor with its own temperature control is provided in the wedge-tip zone for the heating element(s) there so that heating in the wedge-tip zone shall take place reliably to the selected nominal temperature.

The above described apparatus is especially suitable for plastic sheeting 2 mm thick or more. Where apparatus shall be used for welding sheeting from 0.5 to 2 mm thick, it was found appropriate to provide a switch system whereby the heater segment of one heating surface, as a rule the heating surface for the upper sheeting edge, can be switched OFF and the temperature sensors of the opposite heater segments can be connected to the temperature control of the heater segment associated to the other heating surface in such a way that the sheeting edge made to pass over this heater segment is raised to the temperature of the opposite sheeting edge before reaching the wedge-tip zone comprising the heating element(s) there. As regards such thin sheeting, these heating elements do suffice to plasticize the sheeting edges to the welding temperature. In that case the heater segment for the lower sheeting edge serves merely to match the temperature of that edge to the temperature of the above, incoming sheeting edge that may have been raised to a substantially higher temperature by sunlight than the lower sheeting edge. The temperatures of the sheeting edges are detected by the temperature sensors and the temperature differential is fed as a control value to the temperature control of the heater segment for the lower sheeting edge.

Where only thin sheeting shall be welded together with the apparatus, the problem basic to the invention also may be solved by equipment of the initially cited kind comprising a preheater near the dull end of the heater and preceding one of the heating surfaces or being mounted in the heater, and associated with temperature sensors to detect the temperatures of the sheeting edges entering the apparatus, the temperature sensors and the preheater being so wired by means of a temperature control that the sheeting edge made to pass over the preheater upon leaving it will be approximately at the temperature of the opposite sheeting edge. The temperature of the sheeting edge entering the apparatus shall be construed to be that which is present in the particular sheeting edge when leaving the preheater but before having entered the heater proper.

This preheater furthermore can be installed as an accessory in already extant equipment of the species, and then also for processing thicker sheeting. The preheater assures temperature-matching of the two sheeting edges by appropriately raising the temperature of the particular colder sheeting edge to the temperature of the warmer sheeting edge. Thereupon further heating to the plasticizing or welding temperature is taken over by the heating elements in the heater, and this function no longer requires then separately controlled heating elements.

The invention is illustrated in further detail by means of embodiments shown in the drawing.

Figure 1:
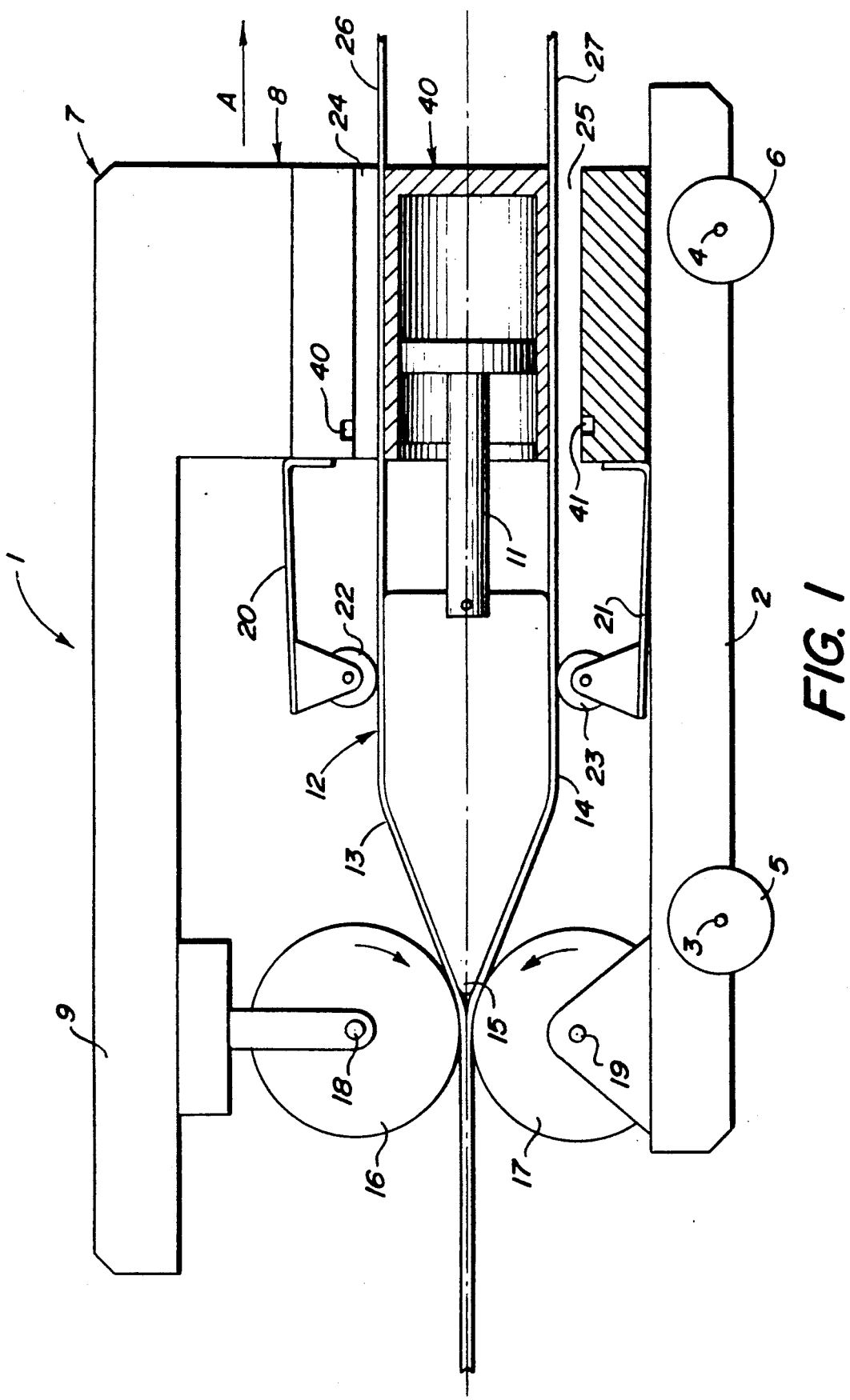
FIG. 1 is a sideview of an apparatus for welding sheeting edges.

The apparatus 1 shown in FIG. 1 comprises an undercarriage 2 with two axles 3, 4, each bearing two wheels 5, 6. The apparatus 1 is displaceable in the direction of the arrow A in the plane of the drawing.

A girder 7 with a vertical segment 8 and a rearward horizontal segment 9 is affixed to the undercarriage 2. A cylindrical telescoping means 10 is present in the vertical segment 8, with a rearward projecting piston rod 11. A wedge-shaped heater 12 is mounted to the free end of said rod 11. This heater 12 comprises an upper heating surface 13 and a lower heating surface 14; in the manner of conventional equipment for making two mutually parallel welding seams, these heating surfaces 13, 14 also may be split up (see for instance the German Offenlegungsschrift 35 35 759). Both heating surfaces 13, 14 converge to the rear into an acute angle and merge at the wedge tip 15. The heater 12 extends by several cm perpendicularly to the plane of the drawing.

A pair of compression-and-advance rollers 16, 17 are mounted next to the wedge tip 15. The two compression-and-advance rollers 16, 17 rotate about horizontal axles 18, 19 which are in a perpendicular plane. At least one of the compression-and-advance rollers 16, 17 is prestressed by a commensurate pressure toward the other compression-and-advance roller 16, 17 and at least one of the compression-and-advance rollers 16, 17 is driven. In lieu of one pair of compression-and-advance rollers 16, 17, two consecutive pairs also may be provided, the first and that adjoining directly the wedge tip 15 being purely compressive and the following pair serving as advance means.

Moreover, spring-loading brackets 20, 21 extending in the direction of the heater 12 are mounted on the vertical segment 8 of the girder 7 and bear compression rolls 22, 23. The spring-loading brackets 20, 21 force these compression rolls 22, 23 towards the heating surfaces 13, 14.

Horizontal inlet slots 24, 25 pass through the vertical segment 8 of the girder 7. The upper inlet slot 24 is open as seen by the observer of FIG. 1. The lower inlet slot 25 is closed as seen by the observer of FIG. 1—for that reason too, this zone is shown in section—and open in the direction away from the observer. Contactless temperature sensors 40, 41 are mounted near the left ends of the inlet slots 24, 25.

Both inlet slots 24, 25 serve to introduce overlapping sheeting edges 26, 27, the upper sheeting edge 26 belonging to a sheeting extending toward the observer and the lower sheeting edge 27 belonging to a sheeting extending away from the observer. The apparatus 1 moves in the longitudinal direction of the sheeting edges 26, 27 as shown by the arrow A. The sheeting edges 26, 27 while being commensurately raised from the ground enter the inlet slots 24, 25, pass through them and next are made to pass over the heating surfaces 13, 14 of the heater 12 while resting on them, and during this time are compressed by the compression rolls 22, 23. The sheeting edges 26, 27 are heated so much by the heating surfaces 13, 14 that they shall be plasticized inside, at the latest and so much, when reaching the wedge tip 15 that they shall weld together when passing through the slit between the compression-and-advance rollers 16, 17. The advance in apparatus 1 is generated by the compression-and-advance rollers 16, 17. After leaving the compression-and-advance rollers 16, 17, the sheeting edges 26, 27 form a welded unit which is perfectly tight.

Figure 2:
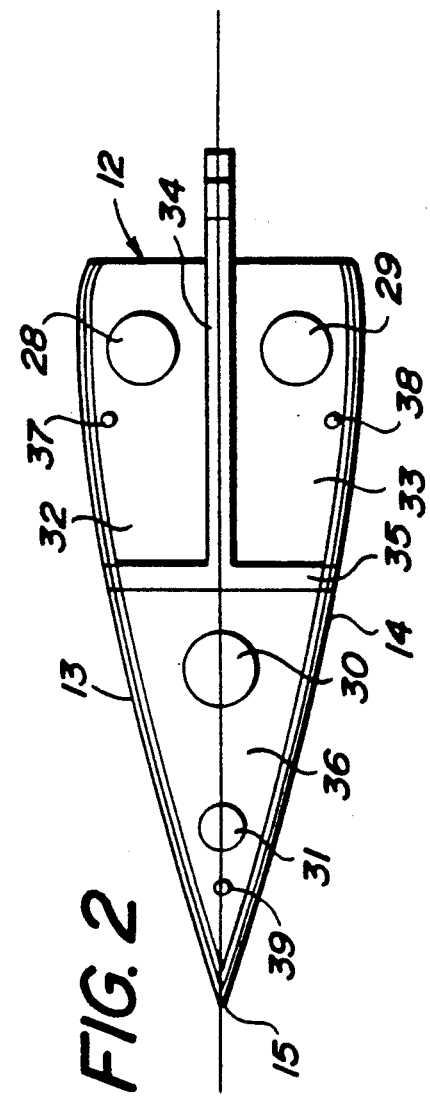
FIG. 2 is a sideview of the heater of the apparatus of FIG. 1.

FIG. 2 shows the design of the heater 12 in further detail. The heater 12 is provided with a total of four heating rods 28, 29, 30, 31 extending perpendicularly to the plane of the drawing through the heater 12. The two heating rods 28, 29 adjacent to the dull end of the heater 12 are superposed each inside a heater segment 32, 33 separated by an insulating partition 34 passing transversely through the heater 12 and serving as a thermal insulator. A vertical insulating wall 35 is present at the front end of this horizontal insulating partition 34 and thermally separates the heater segments 32, 33 from a wedge-tip zone 36 of the heater 12. The two heater segments 30, 31 are symmetrical to the heating surfaces 13, 14 in this wedge-tip zone 36 and follow one another in the direction of advance.

Temperature sensors 37, 38 are mounted next to the two heating rods 28, 29 directly adjoining the heating surfaces 13, 14. Another temperature sensor 39 is in the immediate vicinity of the wedge tip 15.

The temperature sensor 37 in the heater segment 32 is connected through a control to the heating rod 28. In corresponding manner the lower temperature sensor 38 in the lower heater segment 33 is connected through a control to the heating rod 29. The heating rods 30, 31 in the wedge-tip zone 36 are controlled by a temperature sensor 39.

As shown by FIG. 1, additional temperature sensors 40, 41 are mounted in the inlet slots 24, 25 which detect in contactless manner the temperatures of the sheeting edges 26, 27 entering said inlet slots. They are coupled to the temperature controls of the particular subsequent heater segments 32 and 33, resp.

The heating rods 28, 29, 30, 31 are controlled as follows:

The temperature differential between the two entering sheeting edges 26, 27 is detected by the temperature sensors 40, 41. As long as this temperature differential does not exceed a given threshold value—for instance for weak sunlight or none—the temperature controls for the heating rods 28, 29 remain unactuated. In that case the sheeting edges 26, 27 move onto the heating surfaces 13, 14 of the heater 12 where first the heating rods 28, 29 in the heater segments 32, 33 will heat them. The temperature of the upper sheeting edge 26 as a rule being higher than that of the lower sheeting edge 27—covered by the upper one—, and this condition being detected by the associated temperature sensors 37, 39, the heat output from the heating rods 28, 29 is so controlled by the temperature control that by means of the lower heating surface 14 more heat shall be transferred between the two sheeting edges 26, 27 in order to compensate the temperature differential, than by the upper heating surface 13. Ideally the control shall be such that after the sheeting edges 26, 27 exit the heater segments 32, 33, that is when in the vicinity of the vertical insulating partition 35, they will evince the same temperature. This temperature may be preset.

When the sheeting edges 26, 27 then move over the wedge-tip zone 36, they are heated by means of the heating rods 30, 31 up to the plasticizing temperature optimal for welding. This process is controlled by the temperature sensor 39, that is, the heating rods 30, 31 are so controlled with respect to their output that the temperature sensor 39 near the wedge tip 15 measures the optimal temperature.

If the temperature sensors 40, 41 detect a temperature differential beyond a given threshold value, for instance if the upper sheeting edge 26 has been strongly heated because of exposure to intensive sunlight, then this information is conveyed to the control related to the upper heating rod 28. As a result the upper heating rod 28 is shut OFF for a given time, regardless of the temperature the related temperature sensor 37 is detecting. This time can coincide with the time interval required by the region of the sheeting edge 26 that was just detected by the temperature sensors 40, 41 to move onto the heater 12. Only thereupon will the standard temperature control by means of the temperature sensor 37 begin, that is, the blockage triggered by the temperature sensors 40, 41 will be lifted. In this manner better linearity is achieved in heating the upper sheeting edge 26, ie, initial excessive heating of the sheeting edge 26 is averted.

The above described heating procedure of the sheeting edges 26, 27 is especially applicable to sheeting 2 mm thick and more. As regards heating sheetings with lesser thicknesses, a switch system not shown here in further detail is provided. By means of this switch system the upper heating rod 28 will be turned OFF. The temperature sensors 37, 38 are assigned to the temperature control for the lower heating rod 29 in the lower heater segment 33 and are used for temperature control. Thereupon, as the sheeting edges 26, 27 enter the apparatus, the temperature sensors 37, 38 detect the incoming temperatures of the sheeting edges 26, 27. The temperature of the upper sheeting edge 26 as a rule being higher than that of the lower sheeting edge 27, the lower heating rod 29 is so controlled by means of the ascertained temperature difference that the lower sheeting edge 27 is heated, though only to a temperature corresponding to the incoming temperature of the upper sheeting edge 26. Accordingly there is no heating of the upper sheeting edge 26 as far as the vertical insulating partition 35, instead there is only warming the lower sheeting edge 27 to the incoming temperature of the upper sheeting edge 26. Only thereafter are the two sheeting edges 26, 27 heated strongly to the anticipated plastizing temperature. This switch system can consist of conventional electrical or electronic means and therefore is suitable for this sheeting because the power of the two rear heating rods 30, 31 is adequate for their heating in the light of their low heat capacity.

Figure 3:
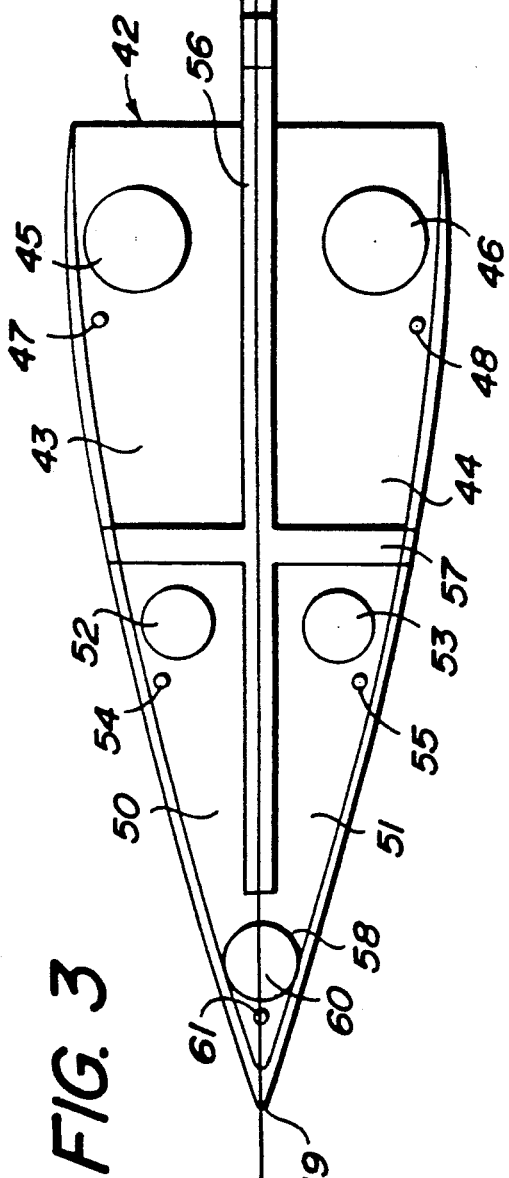
FIG. 3 is a sideview of another heater-design.

FIG. 3 shows a somewhat modified heater 42 on a larger scale. The design in the front, dull zone of the heater 42 is similar to that of the heater 12, that is, two superposed heater segments 43, 44 are provided each comprising a heating rod 45, 46 and a temperature sensor 47, 48. Contrary to the case of the heater 12, in this embodiment two further heater segments 50, 51 adjoin in the direction of the wedge tip 49 and also are each provided with a heating rod 52, 53 and a temperature sensor 54, 55. All heater segments 43, 44, 50, 51 are separated by a horizontal insulating partition 56 and a vertical insulating partition 57.

There remains in this case a zone 58 adjacent to the wedge tip 49 and containing a heating rod 60 and a temperature sensor 61.

This heater 42 allows slower and more fine-control matching of the temperatures of the sheeting edges 26, 27. When the two sheeting edges 26, 27 move over the heater segments 43, 44, illustratively such matching can take place initially to a slight temperature difference between said edges. The subsequent matching is carried out in such manner that the temperatures of these edges 26, 27, which essentially are equal, will occur when they move over the adjoining heater segments 50, 51. The last part of heating to the plasticizing temperature then is assumed by the heating rod 60.

Otherwise the control takes place as for the heater 12. Moreover the above described switch system for heating very thin sheeting edges 26, 27 may be provided whereby, in such cases, when they move over the heater segments 43, 44, first only the lower sheeting edge 25 is heated to the incoming temperature of the upper sheeting edge 26.

Figure 4:
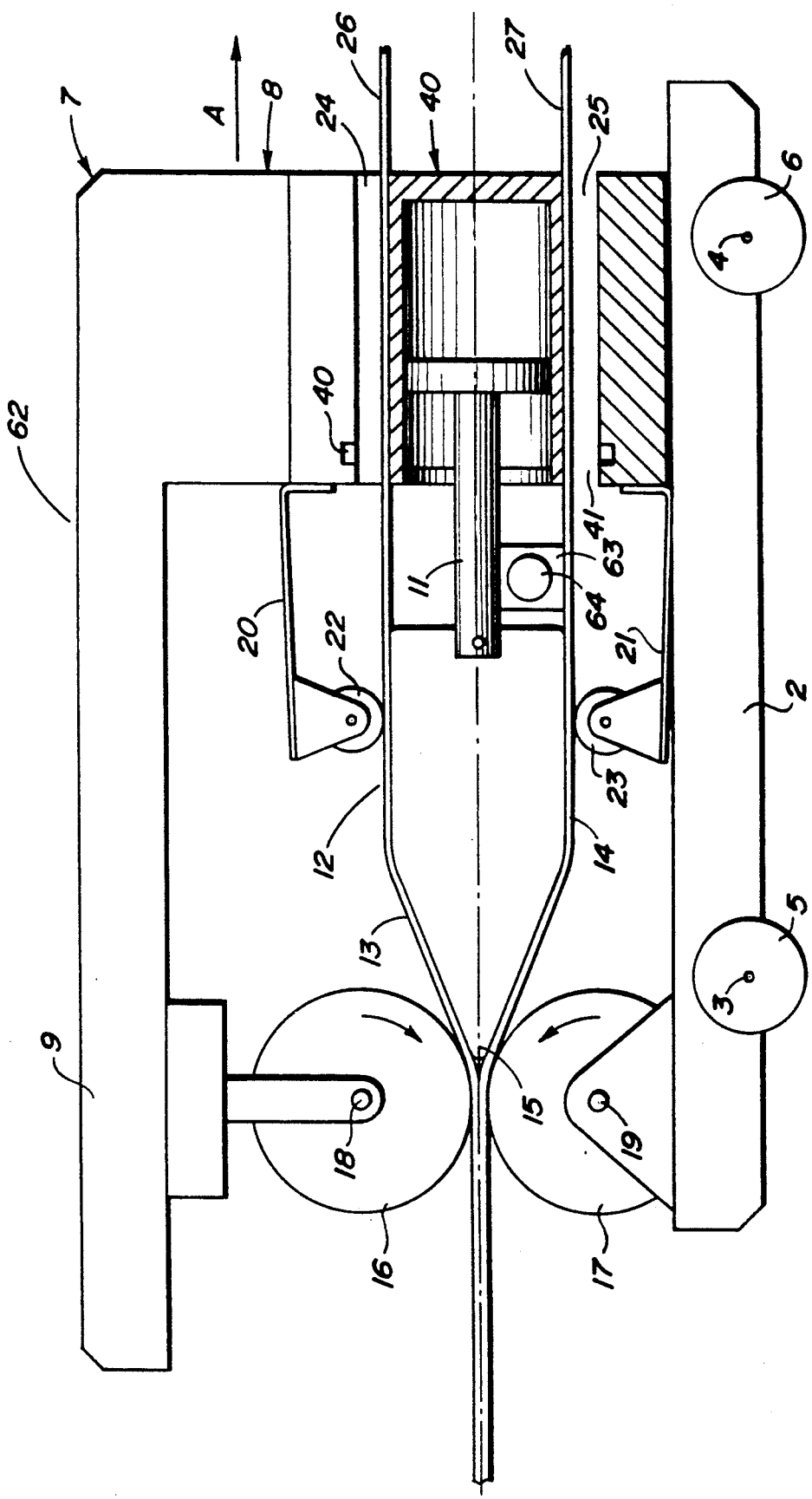
FIG. 4 is the sideview of another apparatus for welding sheeting edges.

The apparatus 62 shown in FIG. 4 substantially is the same as the apparatus 1 shown in FIG. 1 and therefore the same components used in both will be denoted by the same references. Except for the differences discussed below, reference is made to the discussion relating to apparatus 1 of FIG. 1.

Near the dull end of the wedge-shaped heater 12 the apparatus 62 comprises a preheater 63 mounted on the piston rod 11 of the telescoping cylinder means 10 and resting on the top side of the lower sheeting edge 27. This preheater 63 is equipped with a heating rod 64 extending perpendicularly to the plane of the drawing transversely through the preheater 63. The typically colder lower sheeting edge 27 can be heated by means of this heating rod 64 before it arrives at the heater 12 for the purpose of being raised to the temperature of the upper sheeting edge 26 which most of the time has been heated by sunlight.

For that purpose the heating rod 64 is connected by means of a temperature control, not shown in further detail herein, with the temperature sensors 40, 41. These sensors detect the temperature differential between the two sheeting edges 26, 27 and control the heat output of the heating rod 64 in such manner by means of the temperature control that the lower sheeting edge 27 is preheated to the incoming temperature of the upper sheeting edge 26. In this manner the two sheeting edges 26, 27 are at the same temperature when arriving at the heating surfaces 13, 14 of the heater 12.

Instead of the above design, however, the temperature sensors 40, 41 also may be mounted between the heater 12 and the preheater 63 or else in the vicinity of the dull end of the heater 12 itself. In that case a temperature control is provided which so controls the heat output of the heating rod 64 that the temperatures of the sheeting edges 26, 27 detected by the temperature sensors 40, 41 are the same. If deviations arise, the heat output of the heating rod 64 is raised or lowered by the control in such a way that the temperature difference detected by the temperature sensors 40, 41 goes to zero.

In this instance the heater 12 is designed and controlled in such manner that the sheeting edges 26, 27 are heated evenly on both heating surfaces 13, 14 to the optimal plasticizing temperature. Conventional, known heaters may be used, or else the heaters 12, 42 shown in FIGS. 2 and 3, in the latter cases the temperature sensors 37, 38, 39; 47, 48, 54, 55, 61 being used merely to so control the heat output that the desired plasticizing temperature shall be achieved.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. Apparatus (1). for overlap-welding of sheeting edges (26, 27) and comprising a wedge-shaped heater (12, 42) with first and second heating surfaces (13, 14) facing away from each other and converging at a wedge tip (15, 49), further comprising compression-and-advance rollers (15, 16) near said wedge tip (15, 49), said wedge-shaped heater comprising at least one heater segment (32, 43, 50) associated with one heating surface (13) and, independently, a second heater segment (33, 44, 51) associated with the other heating surface (14) and facing away from said one heating surface (13), each heater segment (32, 33, 43, 44, 50, 51) including at least one heating element (28, 29, 45, 46, 52, 53) having a temperature sensor (37, 38, 47, 48, 54, 55) to detect the pertinent sheeting-edge temperature and further having a temperature control.

2. Apparatus defined in claim 1, characterized in that two heater segments (43, 44, 50, 51) are mounted in consecutive manner toward said wedge tip (49) and each segment is associated with one of said heating surfaces.

3. Apparatus defined in claim 1, characterized in that a temperature sensor (40, 41) is upstream of at least one of said heating surfaces (13, 14) and is wired in such manner to the associated heating element (45, 52), that when said sensor detects a temperature exceeding a limit value, the associated heating element (37) shall be turned OFF for a specific time.

4. Apparatus defined in claim 3, characterized in that the turn-OFF time essentially corresponds to that time during which the sheeting-edges (26, 27) move relative to the temperature sensor (40, 41) and a first heater segment.

5. Apparatus defined in claim 3, characterized in that said temperature sensor is a contactless sensor.

6. Claim defined in claim 1, characterized in that said heater segments extend as far as the wedge tip.

7. Apparatus defined in claim 1, characterized in that said heater segments (32, 33, 34, 44, 50, 51) extend partially along said heater (12, 42) and terminate upstream of a wedge-tip zone (36, 58) formed by said heating surfaces.

8. Apparatus defined in claim 7, characterized in that the heater (12, 42) comprises additionally at least one heating element (30, 31, 60) located in said wedge-tip zone (36, 58) for heating both wedge surfaces (13, 14).

9. Apparatus defined in claim 1, characterized in that said heater segments (32, 33, 50, 51) are separated from each other by a thermal insulation (35, 57).

10. Apparatus defined in claim 8, characterized in that at least one additional temperature sensor (39, 61) is present in said wedge-tip zone (36, 58), and said additional sensor has a temperature control for the heating element (30, 31, 60) in said zone.

11. Apparatus defined in claim 8, characterized in that a switch system is provided whereby the heater segment (32, 43, 50) belonging to one heating surface (13) can be turned OFF and the temperature sensor (37, 38, 47, 48, 54, 55) of the opposite heater segments (32, 33, 43, 44, 50, 51) can be hooked-up in such a way with the temperature control of the heater segment (33, 44, 51) associated to the other heating surface (14) so that a first sheeting edge (27) made to pass over said opposite heater segment (33, 44, 51) is raised to the temperature of an opposite second sheeting edge (26) before it has reached said wedge-tip zone (36).

12. Apparatus for overlap-welding of sheeting edges (26, 27) and comprising a wedge-shaped heater (12) with heating surfaces (13, 14) facing away from each other but converging at said heater's wedge-tip (15) and said heater having a dull end opposite said wedge-tip, further comprising compression-and-advance rollers (16, 17) mounted next to the wedge-tip (15), the heater (12) including at least one heating element (28, 29, 30, 31; 45, 46, 52, 53, 60) which is wired to a temperature control to maintain a predetermined temperature, furthermore a preheater (63) being provided adjacent to said dull end of said heater (12) and serving to heat only one of the sheeting edges (27), temperature sensors (40, 41) being associated with the preheater (63) to detect the temperatures of the sheeting edges (26, 27) entering said apparatus, the temperature sensors (40, 41) and the preheater (63) being so wired through a temperature control means that the sheeting edge (27) made to pass over the preheater (63) when leaving same assumes the approximate temperature of the opposite sheeting edge (26).

13. Apparatus for welding overlapping edges of plastic sheeting, comprising:
   (a) a wedge-shaped heater assembly having spaced first and second heating surfaces converging to a wedge-tip;
   (b) a heating element operably associated with each of said surfaces for causing heating thereof;
   (c) a sensor operably associated with each surface for monitoring the temperature of sheeting passing therealong;
   (d) control means operably associated with each of said sensors and with the associated heating element for controlling operation of each of the heating elements in response to the temperature monitored by the associated sensor; and
   (e) means proximate said wedge-tip for causing sheeting to be advanced over said surfaces and to be compressed together upon passing beyond said wedge-tip for thereby being welded together.

14. The apparatus of claim 13, wherein:
   (a) insulating means are disposed between each of said heating elements.

15. The apparatus of claim 13, wherein:
   (a) each of said sensors is a contactless sensor and is spaced from the associated surface.

16. The apparatus of claim 13, wherein:
   (a) means are operably associated with each of said surfaces for urging sheeting passing therealong against the associated surface.

17. The apparatus of claim 16, wherein:
   (a) each of said urging means is a spring-loaded roller assembly;
   (b) said causing means includes first and second rotatable rollers; and
   (c) each of said roller assemblies is spaced upstream of an associated one of said rollers.

18. The apparatus of claim 13, further comprising:
   (a) a third heating element disposed within said heater assembly and positioned proximate said wedge-tip;
   (b) each of said first mentioned heating elements positioned within said heater assembly; and
   (c) insulation means disposed between said first, second and third heating elements for providing thermal insulation therebetween.

19. The apparatus of claim 13, further comprising:
   (a) a movable carriage;
   (b) said heater assembly, heating elements, sensors, control means and causing means connected to and movable with said carriage; and
   (c) means operably associated with said carriage and with said heater assembly for causing movement of said heater assembly relative to said causing means.

* * * * *